(12) United States Patent
Willett

(10) Patent No.: US 6,849,310 B2
(45) Date of Patent: Feb. 1, 2005

(54) CONTIGUOUS COLLIQUEFACTION FORMING A SURFACE FILM FOR A COMPOSITE STRIP

(75) Inventor: Kevin R. Willett, Maryville, TN (US)

(73) Assignee: Schlegel Corporation, New York, NY (US)

(*) Notice: Subject to any disclaimer, the term of this patent is extended or adjusted under 35 U.S.C. 154(b) by 11 days.

(21) Appl. No.: 09/839,887

(22) Filed: Apr. 20, 2001

(65) Prior Publication Data

US 2002/0152687 A1 Oct. 24, 2002

(51) Int. Cl.⁷ .................. B60R 27/00; B60J 10/02; B60J 10/08; F16J 15/10; F16J 15/12
(52) U.S. Cl. .................. 428/31; 428/122; 428/332; 428/358; 428/457; 428/465; 49/475.1; 49/490.1; 49/498.1; 296/93
(58) Field of Search .................. 428/31, 122, 358, 428/332, 457, 465, 909, 908.8, 492, 494; 427/189, 195; 49/475.1, 490.1, 498.1; 296/93

(56) References Cited

U.S. PATENT DOCUMENTS

| | | |
|---|---|---|
| 4,027,066 A | 5/1977 | Victorius |
| 4,210,565 A | 7/1980 | Emmons |
| 4,291,076 A * | 9/1981 | Katoh et al. ............ 49/479 |
| 4,442,156 A | 4/1984 | Yamagushi |
| 4,538,380 A | 9/1985 | Colliander |
| 4,551,381 A | 11/1985 | Inoue |
| RE32,261 E | 10/1986 | Hirota et al. |
| 4,753,829 A | 6/1988 | Panush |
| 4,945,123 A | 7/1990 | Miyama et al. |
| 4,994,311 A | 2/1991 | Junker |
| 4,994,327 A | 2/1991 | Kato et al. |
| 5,115,007 A * | 5/1992 | Chihara ............ 524/267 |
| 5,116,636 A | 5/1992 | Hajek et al. |
| 5,143,772 A | 9/1992 | Iwasa |
| 5,202,191 A | 4/1993 | Kato et al. |
| 5,306,537 A | 4/1994 | Gustafson et al. |
| 5,376,454 A | 12/1994 | Sugasawa et al. |
| 5,545,448 A * | 8/1996 | Ford et al. ............ 428/31 |
| 5,554,439 A | 9/1996 | Ohkura et al. |
| 5,628,956 A | 5/1997 | Theusner et al. |
| 5,725,941 A | 3/1998 | Mezger |
| 5,763,011 A * | 6/1998 | Miyama et al. ...... 427/393.5 |
| 5,800,912 A | 9/1998 | Ogiso et al. |
| 5,827,608 A * | 10/1998 | Rinehart et al. ...... 428/332 |
| 6,024,906 A * | 2/2000 | Cook ............ 264/177.2 |
| 6,070,364 A | 6/2000 | Berry |
| 6,084,034 A | 7/2000 | Miyama et al. |

FOREIGN PATENT DOCUMENTS

| | | |
|---|---|---|
| JP | 2144227 | 6/1990 |
| JP | 6025604 | 2/1994 |
| WO | WO 0076677 | 12/2000 |
| WO | WO 0153127 | 7/2001 |
| WO | WO 01/85482 A1 | 11/2001 |

* cited by examiner

Primary Examiner—D. S. Nakarani
Assistant Examiner—Nikolas J Uhlir
(74) Attorney, Agent, or Firm—Brian B. Shaw, Esq.; Stephen B. Salai, Esq.; Harter, Secrest & Emery LLP

(57) ABSTRACT

A contiguous surface film for a composite strip, such as a weatherseal is disclosed, wherein the surface film is formed of a colliquefied powder coating. The surface film can be located on a carrier, sealing or trim portion of the weatherseal, wherein the surface film can be colored, and selected to provide a desired surface characteristic such as reduced coefficient of friction.

52 Claims, 6 Drawing Sheets

CONTIGUOUS COLLIQUEFACTION FORMING A SURFACE FILM FOR A COMPOSITE STRIP

FIELD OF THE INVENTION

The present invention relates to composite strips such as weatherseals and finishing strips, and more particularly, to a surface film on the composite strip, wherein the surface film is a contiguous colliquefaction of a powder coating.

BACKGROUND OF THE INVENTION

Composite strips are typically employed as weatherseals. These weatherseals must perform a variety of functions including the prevention of various contaminants such as moisture, dirt and debris from passing the seal. In motor vehicle applications, the weatherseal must also prevent road, engine, and wind noise from penetrating into a passenger compartment. Additionally, the weatherseal may include trim portions which consumers often demand be of a color to match the vehicle.

In the motor industry, it is common practice to extrude sealing sections either from a black thermosetting polymeric material, which incorporates one or more fillers, or from a thermoplastic material. However, in each case, there is often a requirement for the extrusion to have its characteristics changed. For example, in order to stiffen the thermosetting polymeric material of a U-sectioned edge trim or door seal, a metallic carrier is incorporated within the extrusion. Alternatively, (or additionally) a second polymeric material can be co-extruded with the first polymeric material.

While multi-component, multi layer or composite weatherseals can provide a number of beneficial characteristics, the use of a plurality of materials can create compatibility issues between the materials. These compatibility issues include processing or manufacturing limitations, as well as finishing and performance limitations. The compromises necessitated by the use of distinct materials can adversely effect the weatherseal in construction, function or performance.

Therefore, the need exists for a composite strip such as a weatherseal having a plurality of materials, wherein compatibility limitations and resulting compromises are reduced. The need also exists for a weatherseal that can have selectively colored portions. A need also exists for a weatherseal that can include a plurality of components, each formed of a different material, wherein the components can be covered by a single contiguous surface film. A further need exists for a surface film that can result in reduced material and weight parameters. The need exists for a weatherseal that can employ the aesthetic benefits of a thermoplastic surface layer and still provide ease of handling and installation of traditional single component rubber weatherseals.

SUMMARY OF THE INVENTION

The present invention includes a composite strip having a contiguous surface layer formed of a colliquefied powder coating, wherein the composite strip can be a weatherseal or finishing profile. The surface film provides a colorable and flexible layer that can bond to a variety of substrates. The surface film is formed from a powder coating, which can include thermoset, thermoplastic or both thermoset and thermoplastic materials. The surface film can be formed to exhibit any of a variety of gloss appearances, including high, medium or low gloss in a variety of colors. In addition, through the selection of the materials in the powder coating, the surface film can provide a reduced co-efficient of friction. The surface film can also be constructed to provide a wear resistant surface for a glass contacting area of a weatherseal.

The present invention can be incorporated into a resilient sealing structure such as a weatherseal typically having a body and a sealing portion, wherein the surface film is integrally bonded to at least one of the body or the sealing portion. The present surface film can also be applied to finishing strips such as flange finishers and trim strips.

It is contemplated the powder coating of the surface film can be selected to bond on portions of the composite strip that are formed of different materials. In contrast to prior applications of powder coatings, the present invention contemplates applying the powder coating to, and forming the surface film on a resilient or flexible substrate such as an elastomeric or polymeric weatherseal.

DETAILED DESCRIPTION OF THE PREFERRED EMBODIMENTS

Figure 1:
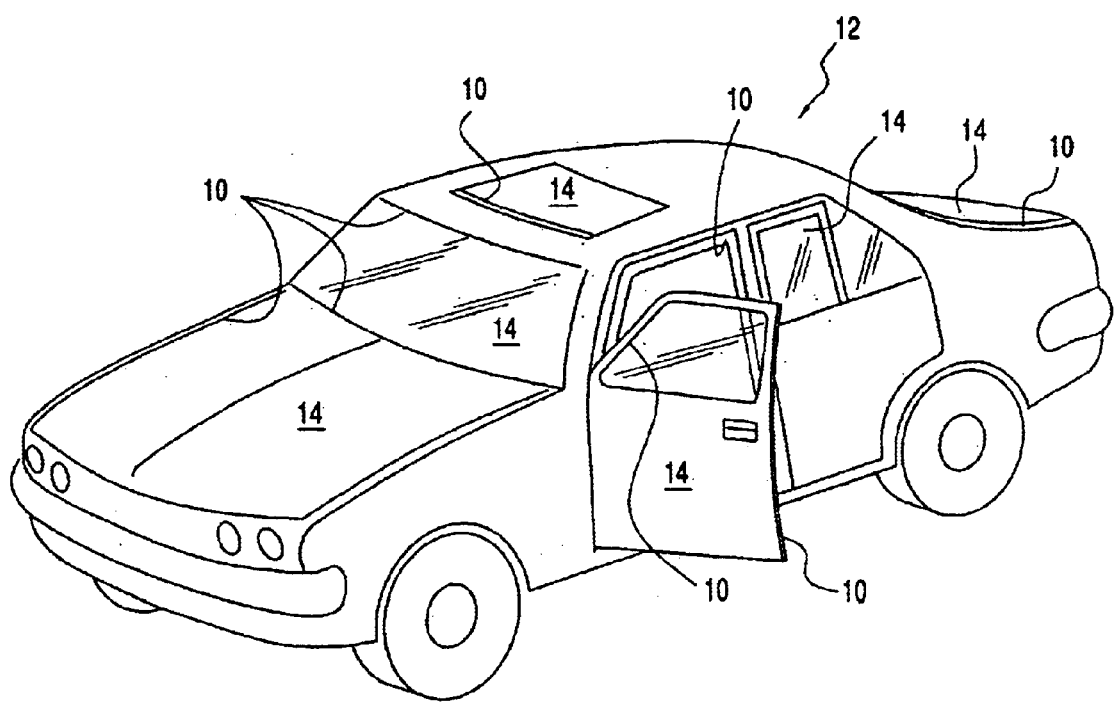
FIG. 1 is a perspective view of a vehicle showing a variety of locations of a weatherseal configuration of the composite strip having a surface film.
Figure 2:
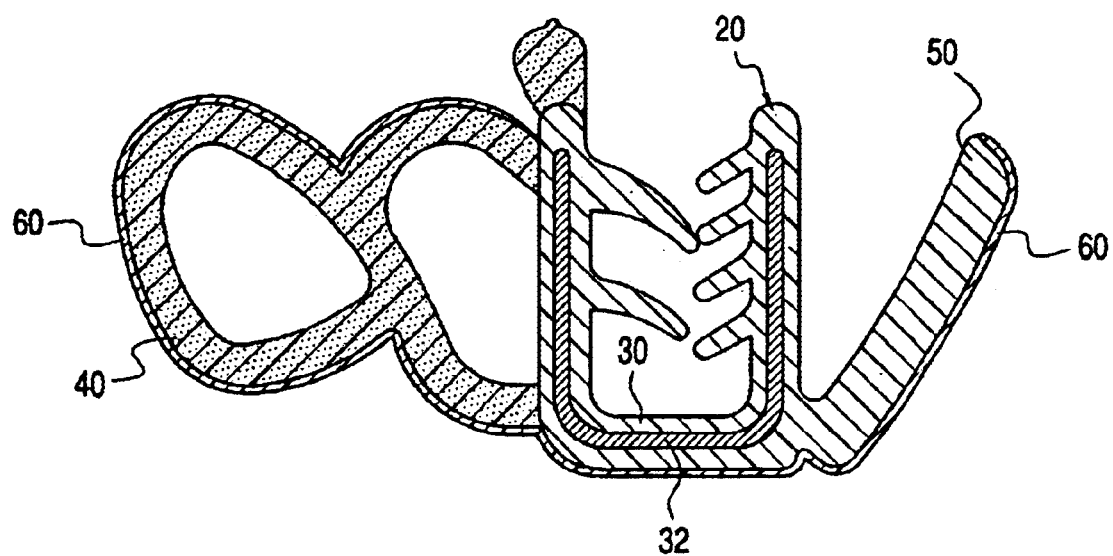
FIG. 2 is a cross-sectional view of a typical door seal including the surface film on the carrier portion, the sealing portion and the trim portion of the weatherseal.
Figure 3:
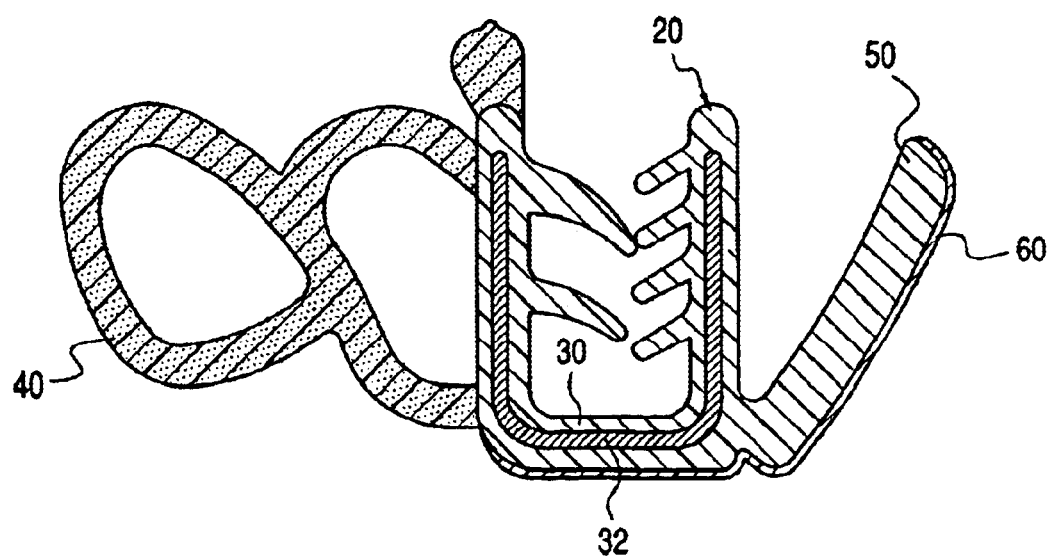
FIG. 3 is a cross sectional view of a typical door seal including the surface film on the carrier portion and the trim portion.
Figure 4:
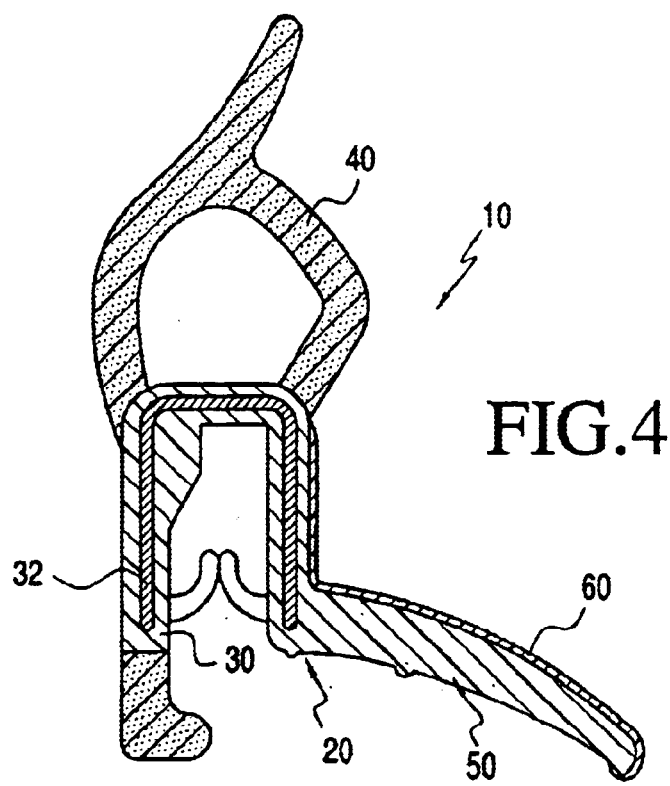
FIG. 4 is a cross-sectional view of a typical deck lid seal including the surface film.
Figure 5:
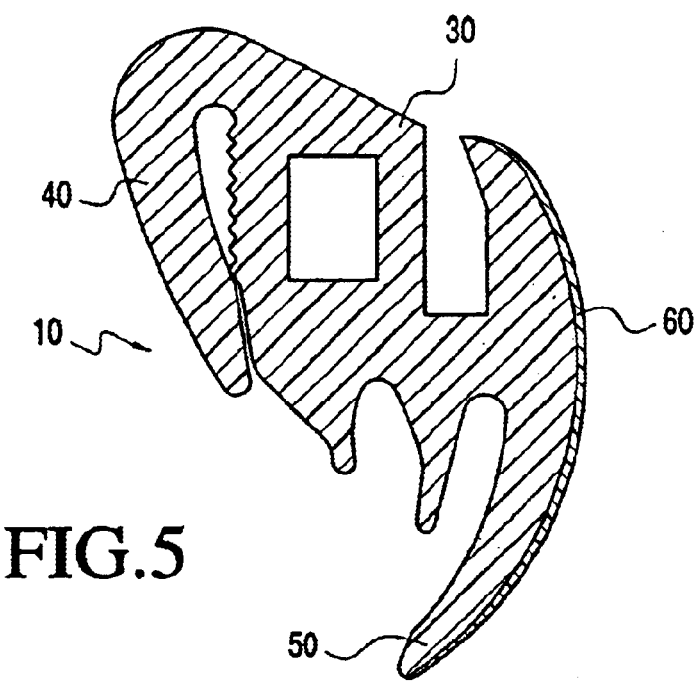
FIG. 5 is a cross-sectional view of a typical rear window seal including the surface film.
Figure 6:
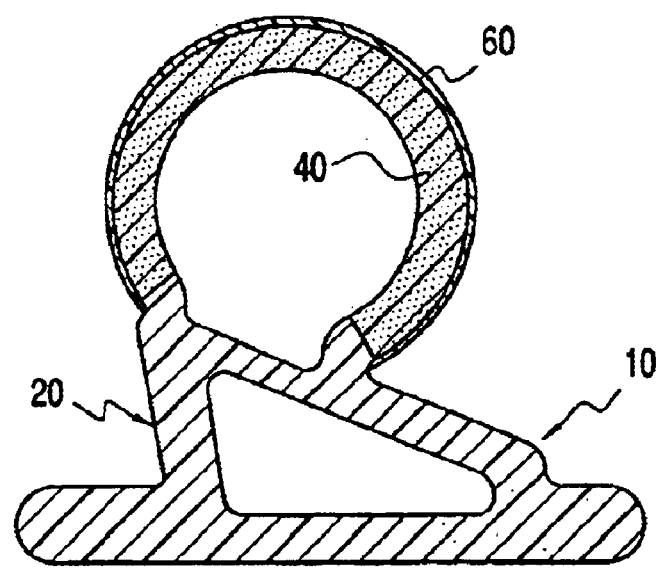
FIG. 6 is a cross sectional view of a typical channel mount construction of a weatherseal configuration of the composite strip incorporating the surface film.
Figure 7:
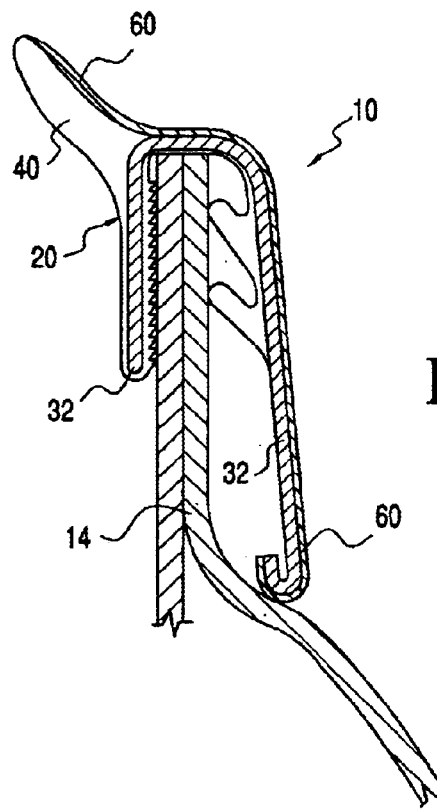
FIG. 7 is a perspective view of a weatherseal, having the surface film.
Figure 8:
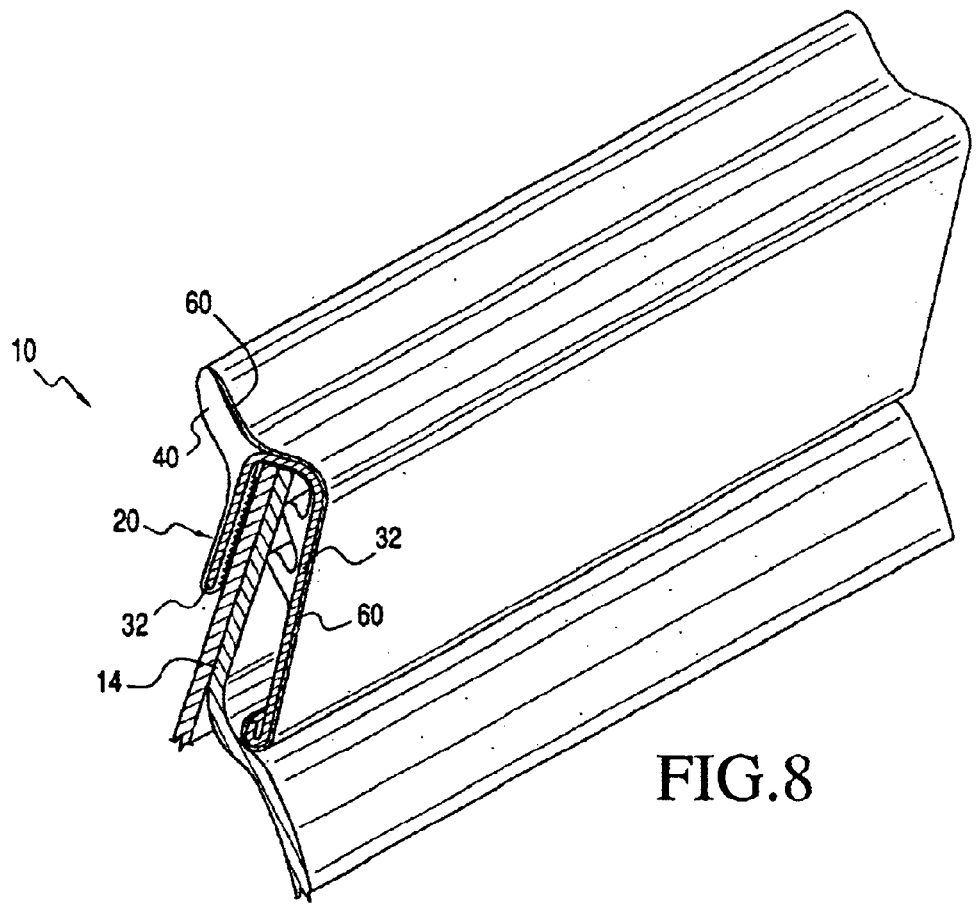
FIG. 8 is a perspective view of a glass run channel configuration of the composite strip with the surface film.
Figure 9:
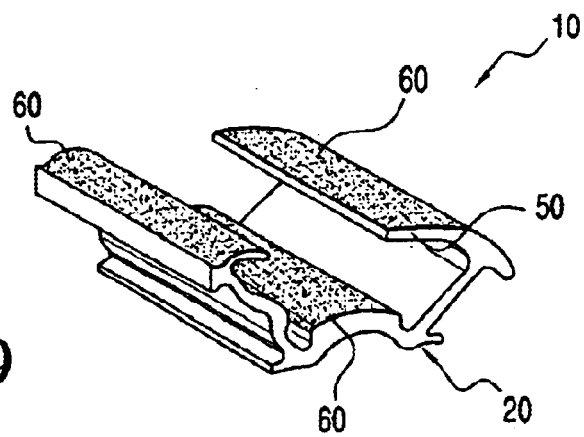
FIG. 9 is a perspective view of an alternative construction of a weatherseal having the surface film.
Figure 10:
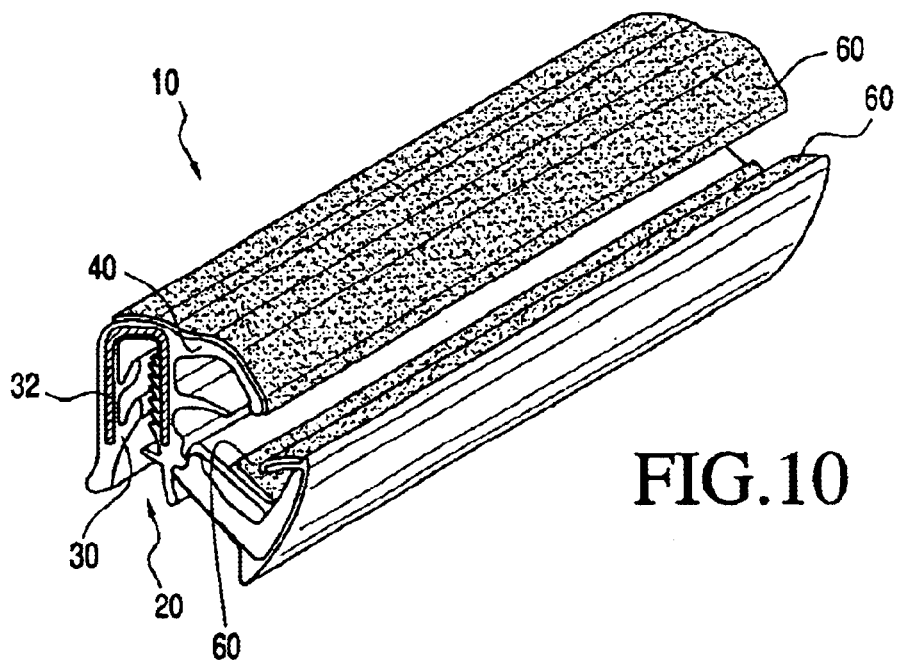
FIG. 10 is a perspective view of a further construction of the weatherseal including the surface film.
Figure 11:
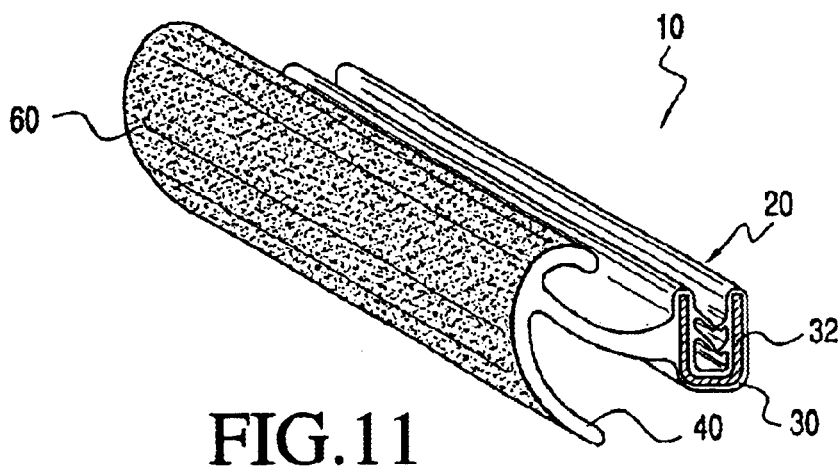
FIG. 11 is a perspective view of a further construction of the weatherseal including the surface film.

Referring to FIG. 1, the composite strip of the present invention can be employed as a weatherseal 10 in a motor vehicle 12. The weatherseal 10 can be used in a variety of locations for releasably and repeatedly engaging a panel 14. The composite strip is described as a weatherseal, however, it is understood the present invention can be employed in a trim or finishing application, which may not provide any sealing function. Thus, although the detailed description of the composite strip is directed to the sealing configuration such as a weatherseal 10, it is understood the same teachings can be applied to non-sealing configurations including trim or finishing strips.

Typically, the weatherseal 10 configuration of the composite strip is disposed between confronting surfaces such as panels 14. The panels 14 may be any of a variety of materials and do not limit the present invention. For example, the panel 14 may be glass, metal or a composite, which is painted, surface treated or bare. In the operating environment, the panel 14 can be brought repeatedly into and out of engagement with the weatherseal 10. Alternatively, the weatherseal 10 may be moved relative to the panel 14. Further, the weatherseal 10 and the panel 14 may be located in a substantially fixed relationship. For example, the weatherseal 10 may be located about a fixed panel 14 such as a front or rear window.

The term weatherseal includes, but is not limited to, extrusions, moldings, edge pieces, glass guidance components, glass run channels, weather strips and seals including channel mount or pin type mounted seals. The weatherseal 10 may be used as a weather strip in structural sealing applications including residential and commercial buildings, marine vehicles as well as the motor vehicle industry. In the motor vehicle industry, the weatherseal configuration is suitable for use in many areas including, but not limited to, storage compartments, glass guidance components, glass run channels, door seals, roof rails, deck lids, hood to cowl seals, window seals, sun roof seals, van sliders, hatch backs or window channel seals.

It is understood the composite strip can be constructed and operably located in a position that does not perform a sealing function. One example of such non-sealing application is a flange finisher, trim or trim piece. Typical flange finishers are disposed on a flange to provide an aesthetically pleasing appearance, as well as reduce the risks associated with an otherwise exposed flange.

Referring to FIGS. 2–12, the weatherseal 10 includes a body 20 and a colliquated powder coating forming a continuous surface film 60.

Body

As seen in FIGS. 2–4, 7–8 and 10–11, the body 20 can include a carrier portion 30, a sealing portion 40 and a trim portion 50. However, referring to FIGS. 6 and 9, the body 20 can include only the carrier portion 30 and the sealing portion 40.

Typically, the carrier portion 30 is the part of the body 20, which attaches the weatherseal 10 to one of the confronting surfaces. The carrier portion 30 can have any of a variety of configurations and typically forms a base or substrate upon which the sealing portion 40 and/or trim portion 50 are connected.

The carrier portion 30 can be formed of a variety of materials including plastic, thermoplastic or thermosetting materials, including but not limited to plastic, TPE, EPDM or any combination thereof. The thermoplastic materials can include polyethylene, EVA, PVC or polypropylene. Suitable vulcanized or cross-linked (thermosetting) polymeric materials include EPDM and modified EPDM.

The carrier portion 30 can have a relatively rigid section and a relatively soft or resilient section. That is, the carrier portion 30 can exhibit one or more durometer hardnesses. The carrier portion 30 can include a reinforcing member 32 such as a wire or metal carrier, which may be of known construction (such as knitted wire, lanced and stretched, slotted, solid (continuous) or stamped metal). It is also contemplated the carrier portion 30 can include a thermoplastic section and a thermoset section, wherein each section has a unique rigidity. Further, the carrier portion 30 can be formed at differing thicknesses to provide differing amounts of rigidity. It is contemplated the carrier portion 30 can have any of a variety of cross-sections, wherein typical cross-sections include "U" shaped, "J" shaped, "L" shaped or planar. As shown in FIGS. 2, 3, 7 and 8, the carrier portion 30 can have the U shaped profile with inwardly extending gripping fins for engaging one of the confronting surfaces. Non sealing constructions of the present invention, such as the flange finisher, can be limited to a body 20 employing only the carrier portion 30, wherein the flange finisher can be operably retained by friction, fasteners or adhesives. The body 20 in the flange finisher configuration often has a U shaped cross section with at least one gripping fin for engaging the flange.

The sealing portion 40 is connected to the carrier portion 30 and typically extends from the carrier portion to contact the remaining confronting surface. The sealing portion 40 can have any of a variety of configurations including bulbs, flaps or fingers. The sealing portion 40 can be formed to have a different durometer, or rigidity than the carrier portion 30.

The sealing portion 40 can be constructed from a variety of materials, including but not limited to TPEs, thermoplastics and thermosets, wherein the materials can be solid, foamed, cellular or a sponge construction. Typically, constructions of the invention having a body 20 and a sealing portion 40 may have one or both portions formed of an elastomeric material.

The trim portion 50 is typically connected to the carrier portion 30 and extends to overlay an adjacent part of the relevant confronting surface. Although the trim portion 50 is shown attached to the carrier portion 30, it is understood the trim portion can be connected to the carrier portion, the sealing portion 40 or both. The trim portion 50 is often formed of a different color or texture than the carrier portion 30 and the sealing portion 40. The trim portion 50 can also be formed of a variety of materials including thermoplastics, thermosets and composites. Thus, in the weatherseal configuration, each of the carrier portion 30, the sealing portion 40 and the trim portion 50 can be formed of different materials. Alternatively, these can be any combination of materials among the carrier, sealing and trim portions.

The material forming the body 20, including any of the carrier portion 30, the sealing portion 40 or the trim portion 50 can be doped with a conductive filler to provide the necessary surface charge for attracting the powder coating to the surface. A typical conductive filler can include carbon black. Thus, the selected portion of the body 20 will exhibit a substantially different conductivity than the remaining portions of the body.

Surface Film

The surface film 60 is a powder coating applied to the body 20 and subsequently melted to form a contiguous and preferably continuous surface layer. Thus, the surface film 60 is a colliquefied powder coating forming a contiguous layer. Contiguous includes a single piece connected film, wherein continuous defines an uninterrupted contiguous film. Thus, the present surface film is a single piece, or sheet of material, as opposed to a plurality of discrete, unconnected sections. The surface film 60 is preferably bonded to the body 20 to preclude non-destructive separation. The contiguous surface film 60 can be disposed on any of the carrier portion 30, the sealing portion 40 or the trim portion 50. The surface film 60 can extend over any one, two or all three of the carrier portion 30, the sealing portion 40 or the trim portion 50. Further, the surface film 60 can be located at predetermined area of any one, or all three of the carrier portion 30, the sealing portion 40 or the trim portion 50.

In a preferred configuration, the surface film 60 can be disposed over different portions of the weatherseal which are formed of different materials. That is, for example, the surface film 60 can be operably bonded to a thermosetting carrier portion 30 and a TPE sealing portion 40. Thus, the surface film 60 can be located on different materials and form a single contiguous surface over the different materials. Conversely, a first powder coating can be applied to the weatherseal and colliquefied, whereupon a second powder coating can be applied to a second portion of the weatherseal and then colliquefied. The resulting weatherseal can thus include a plurality of different surface films 60. It is also understood, different powder coatings can be applied to different areas of the body, such that the powder coatings are subsequently and simultaneously melted.

The surface film 60 has a thickness which is sufficiently small to provide flexibility in the film. The flexibility of the surface film 60 does not detrimentally reduce the flexibility of the underlying sealing portion 40. Thus, the surface film 60 can conform with the sealing portion 40 during flexures of the sealing portion. However, it is understood the surface film 60 can be selected according to the desired performance characteristics of the composite strip.

Extruded layers or surfaces of the prior art are typically limited to achieving thicknesses greater than approximately 0.5 mm. In contrast, the present surface film 60 has a thickness less than approximately 0.2 mm and preferably in the range of 0.05 mm to 0.20 mm. As discussed subsequently, the application process for the surface film 60 can be selected to render the thickness of the surface film substantially self-limiting. Thus, the surface film 60 provides a contiguous surface extending over a portion of the weatherseal. The surface film 60 can be formed of a sufficiently reduced thickness, such that upon being located on the sealing portion 40, the surface film does not reduce the resiliency or compliance of the sealing portion. However, it is understood the surface film 60 can be formed to increase the rigidity of the underlying substrate.

Powder coatings are finely ground plastic particles including resin, a crosslinker in thermoset powders, pigments, extenders, and various flow additives and fillers to achieve specific properties. Powder coatings are applied as a dry material and when powder coating is heated, the particles colliquefy (melt) to form a contiguous film, which is typically very durable and chemical resistant.

Powder coating materials can be thermoplastic or thermoset. The thermoplastic powders do not chemically react in a cure phase during colliquefaction.

Thermoset powder coatings are applied and then cured, typically in an oven at a certain temperature for a certain time. The cure process will cause a chemical crosslinking to take place, changing the powder into a contiguous film that will not remelt.

The powders coatings can be formulated to meet a variety of appearance or performance characteristics, including the surface film thickness, gloss, texture, color, and performance (hardness, chemical resistance, UV resistance, temperature resistance. The powder coatings can be selected to provide very smooth finishes, hammertones, wrinkles, and metallics. The particle size of the powder coating can be controlled in response to the desired performance and appearance of the resulting surface film 60.

A thermoset powder coating for the surface film 60 can include a resin particle containing a thermosetting resin, and a particle containing a curing agent.

A thermosetting resin used in the powder coating can include epoxy resins, acrylic resins, phenol resins and polyester resins. These thermosetting resins can be used alone, or combined together with two or more kinds. In particular, a thermosetting resin having an epoxy group (that is, glycidyl group), such as epoxy resins, acrylic resins are available. These thermosetting resins have excellent reactivity to a curing agent comprising the curing particles, even at relatively low temperatures, for example, 120° C. or less.

A latent curing agent such as dicyandiamide, imidazolines, hydrazines, acid anhydrides, blocked isocyanates, and dibasic acids can be added to the resin particles as a curing promoter. The latent curing agent is typically stable at room temperature, and crosslinks with a thermosetting resin in a range of 140° C. to 260° C. It is understood any of a variety of cross-linking agents can be employed.

For thermoplastic or thermoset powder coatings, an additive or a function material can be added to the resin particles, such as a filler such as calcium carbonate, barium sulfate, talc; a thickener such as silica, alumina, aluminum hydroxide; a pigment such as titanium oxide, carbon black, iron oxide, copper phthalocyanine, azo pigments, condensed polycyclic pigments; a flowing agent such as silicone, acrylic oligomer such as butyl polyacrylate; a foam inhibitor such as benzoin; an accelerating agent such as zinc compounds; a wax such as polyolefin; a coupling agent such as silane coupling; an antioxidant; a wear characteristic enhancer such as high density polyethylene; a magnetic powder; a metal powder; or even an antimicrobial agent.

As the surface film 60 can be formed of a variety of materials including thermoplastic and thermoset, the surface film can be selected to provide a variety of aesthetically pleasing colors to either match portions of the vehicle or provide distinct colors of the weatherseal. The surface film 60 can be selected to provide a high gloss, medium gloss or low gloss surface.

Suitable powder coatings, as sold by Morton Powder Coating of Warsaw, Ind. include DG-5001 CORVELL® BLUE (ethylene/Acrylic), DG-7001 CORVEL® BLACK 20 (Ethylene/Acrylic), 78-7001 CORVEL® BLACK (Nylon) and 70-2006 CORVEL® YELLOW (Nylon).

Manufacture

The particular method for providing the surface film 60 is at least partially determined by the materials of the weatherseal 10 and the desired characteristics of the surface film.

The surface film 60 is the colliquefaction of a powder coating, wherein the powder coating is temporarily retained on the weatherseal 10 and subsequently melted in place to form a contiguous surface. The powder coating can be temporarily disposed on the weatherseal 10 by a variety of mechanisms including bonding agents and electrostatic attraction.

The bonding agents can be incorporated into the powder coating, or applied to the weatherseal 10 in a desired location for the surface film 60 prior to exposure of the body 20 to the powder coating.

Alternatively, and preferably, a surface charge is formed on selected portions of the body 20 and the powder coating particles are oppositely charged, such that upon exposure of the oppositely charged particles to the surface charged portions to the body, the powder coating is temporarily adhered. Subsequently, the colliquefaction (melting) steps, as determined by the composition of the powder coating and weatherseal, are employed to transform the powder coating into a contiguous surface of the surface film 60.

As the elastomeric components of the body 20 are typically non-conductive, a potential is created between the surface of the body 20 and the powder coating. That is, a relative surface charge on the body 20 must be achieved. A number of mechanisms are contemplated for the formation of the necessary surface charge on the body 20.

For example, in those constructions of the carrier portion 30 having a metallic reinforcing member 32, a potential is applied to the reinforcing member. It has been found that a sufficient potential can be applied to the reinforcing member 32 to create a charge at the surface of the body 20 that is sufficiently strong to retain the powder coating prior to colliquefaction.

By controlling the electrical potential difference between the powder coating and the surface charge on the body 20, the amount of powder coating retained on the body can be controlled. As the amount of retained powder coating on the body 20 at least partially determines the thickness of the colliquefied surface film 60, the thickness of the surface film can be controlled by the electrical potential used to retain the powder coating on the body 20.

Subsequently, the adhered powder coating is melted by a variety of options including radiative heat, conductive heat, radiation as well as solvents.

Thus, the present surface film 60 allows materials that were previously incompatible in a co-extrusion process, such as a thermoplastic polyamide (Nylon) and rubber, to be bonded upon formation of the surface layer 60. Preferably, the bonding is sufficient to preclude non-destructive separation of the contiguous surface film 60 from the material underlying the surface film.

The ability to bond to previously incompatible materials allows for the use of a broader range of materials in the weatherseal 10.

Upon applying the powder coating by means of a spray, any over-spray of the powder coating can be collected and re-exposed to subsequent sections of the weatherseal. This reuse of the powder coating further reduces material costs.

Further, it is contemplated that through selection of the powder coating and formation of the surface film 60, shrinkage of the underlying body 20 may be inhibited. That is, the surface film 60 can provide a relatively high rigidity that inhibits shrinkage of the body 20.

The use of an powder coating and subsequent colliquefication and bonding to the body 20 allows the body to be formed pursuant to optimal conditions for the material of the body, without having to account for the processing considerations of the surface film 60. The powder coating can be subsequently applied to the body 20 and melted to form the desired surface film 60, through either an on-line or off-line process.

The inherent incompatibility of processing parameters for thermoplastic and thermoset materials can be accommodated by the surface film 60. Specifically, the body 20 can be formed of the desired thermoset material to provide the necessary resiliency, wherein the formation process can be optimized for the thermoset material. After forming the body 20, the powder coating can be applied and melted pursuant to a different and optimized set of parameters.

It has been found the reduced thickness of the surface film 60 requires less materials and thus provides savings in the consumption of the materials. In addition, the use of reduced materials reduces the weight of the seal thereby improving the overall fuel efficiency of the vehicle.

While the invention has been described in connection with a presently preferred embodiment thereof, those skilled in the art will recognize that many modifications and changes can be made therein without departing from the true spirit and scope of the invention, which accordingly is intended to be defined solely by the appended claims.

What is claimed is:

1. An automotive weatherseal, comprising:
   (a) a three dimensional resilient polymeric body;
   (b) a metal reinforcing member connected to the body; and
   (c) a heat fusible powder coating directly on an exterior portion of the metal reinforcing member and directly on an exterior portion of the resilient polymeric body, the heat fusible powder coating selected to fuse as a contiguous surface film on the portion of the metal reinforcing member and the portion of the resilient polymeric body.

2. The automotive weatherseal of claim 1, wherein the resilient polymeric body includes a trim portion and a sealing portion.

3. The automotive weatherseal of claim 1, further comprising a quantity of powder coating to form a surface film of fused powder coating having a thickness less than 0.2 mm.

4. The automotive weatherseal of claim 1, wherein the metal reinforcing member is partially covered by the polymeric body.

5. An automotive weatherseal, comprising:
   (a) a three dimensional substrate having a first portion formed of a first polymeric material and a second portion formed of a different second polymeric material; and
   (b) a colliquefiable powder coating directly adjacent an exposed surface of the first portion and directly adjacent an exposed surface of the second portion, the colliquefiable powder coating selected to colliquefy into a continuous coating on the first portion and the second portion.

6. The automotive weatherseal of claim 5, wherein the first polymeric material is a thermoset material and the second polymeric material is a thermoplastic material.

7. The automotive weatherseal of claim 5, further comprising a metallic reinforcing member connected to one of the first portion or the second portion.

8. The automotive weatherseal of claim 5, wherein a colliquefaction of the powder coating has a thickness between 0.05 mm and 0.2 mm.

9. The automotive weatherseal of claim 5, wherein the powder coating is a thermoset material and the second polymeric material is a thermoplastic material.

10. A weatherseal comprising:
    (a) a three dimensional weatherseal body having a first portion formed of a first material and a second portion formed of a different second material; and
    (b) a colliquefiable powder coating immediately adjacent an exterior portion and immediately adjacent an exterior of the second portion of the weatherseal body, the colliquefiable powder coating selected to colliquefy as a contiguous surface on the first portion and the second portion.

11. The weatherseal of claim 10, wherein the powder coating includes a thermoset and a thermoplastic material.

12. The weatherseal of claim 10, wherein the powder coating includes a thermoplastic material and the first portion is a thermoset material.

13. The weatherseal of claim 10, further comprising a metallic-reinforcing member connected to the weatherseal body.

14. The weatherseal of claim 10, wherein the first portion is a thermoset material, and the second portion is a thermoplastic material.

15. The weatherseal of claim 10, wherein the powder coating is selected to form a colliquefied layer having a thickness less the 0.2 mm.

16. The weatherseal of claim 10, further comprising a metallic-reinforcing member having a U-shaped cross sectional profile connected to the weatherseal body.

17. The weatherseal of claim 10, wherein the powder coating is selected to form a contiguous colliquefaction.

18. The weatherseal of claim 10, wherein the powder coating is located to form a sealing surface.

19. The weatherseal of claim 10, wherein the powder coating is selected to form a colliquefaction having a gloss appearance.

20. A weatherseal for sealing an interface between two confronting surfaces in an automotive vehicle, the weatherseal comprising:
    (a) a three dimensional polymeric base formed of a first material;
    (b) a three dimensional resilient sealing portion for contacting one of the confronting surfaces, the resilient sealing portion formed of a different second material; and
    (c) a heat fusible powder coating directly on at least an exterior portion the base and directly on at least an exterior portion the resilient sealing portion, the heat fusible powder coating being sufficient to form a fused contiguous surface film on the portion of the base and the portion of the resilient sealing portion.

21. The weatherseal of claim 20, wherein the base includes a trim portion and the heat fusible powder coating is located on the trim portion.

22. The weatherseal of claim 20, further comprising a metallic-reinforcing member in the base.

23. The weatherseal of claim 20, wherein the base further comprises a trim portion formed of a different material than the sealing portion, and the heat fusible powder coating is on the trim portion.

24. The automotive weatherseal of claim 23, wherein the trim portion is a thermoplastic material.

25. The automotive weatherseal of claim 23, wherein the trim portion is a thermoset material.

26. An automotive weatherseal, comprising:
    (a) a three dimensional substrate having a first portion formed of a first polymeric material and a second portion formed of a different second polymeric material; and
    (b) a heat fusible powder coating directly on an exterior surface of the first portion on an exterior surface of the second portion, the heat fusible powder coating selected to form a contiguous fused film on the first portion and the second portion.

27. The automotive weatherseal of claim 26, wherein one of the first portion and the second portion forms a trim portion of the weatherseal.

28. The automotive weatherseal of claim 26, further comprising a metal reinforcing member connected to one of first portion and the second portion.

29. The automotive weatherseal of claim 26, wherein the substrate has a U shaped cross section.

30. The automotive weatherseal of claim 26, wherein the substrate includes a metal reinforcing member.

31. A weatherseal for an automotive vehicle, comprising:
    (a) a three dimensional polymeric body;
    (b) a metal reinforcing member connected to the body, one of the body and the reinforcing member selected to engage the automotive vehicle; and
    (c) a colliquefiable powder coating directly adjacent an exterior portion of the reinforcing member and directly adjacent an exterior portion of the polymeric body, the colliquefiable powder coating sufficient to form a contiguous colliquefied surface film on the reinforcing member and the portion of the polymeric body.

32. The weatherseal of claim 31, wherein the polymeric body includes a trim portion.

33. A weatherseal comprising:
    (a) a three dimensional weatherseal body having a first portion formed of a first material and a second portion formed of a different second material; and
    (b) a heat fusible powder coating directly on an exterior of the first portion directly on an exterior of the second portion of the weatherseal body, the heat fusible powder coating selected to fuse as a contiguous surface film on the first portion and the second portion of the weatherseal body.

34. The weatherseal of claim 33, wherein the weatherseal body includes a trim portion.

35. A vehicle weatherseal, comprising:
    (a) a three dimensional thermoplastic weatherseal body having a sealing portion and a carrier portion, and
    (b) a heat fusible powder coating directly on at least a portion of an exterior surface of the sealing portion and directly on at least a portion of an exterior surface of the carrier portion, the powder coating fusible into a contiguous layer on the surface of the sealing portion and the carrier portion.

36. The vehicular weatherseal of claim 35, further comprising a trim portion, wherein one of the trim portion and the sealing portion has one of a foamed, cellular and sponge structure.

37. The vehicular weatherseal of claim 35, further comprising a reinforcing member in the thermoplastic weatherseal body.

38. The vehicular weatherseal of claim 37, wherein the reinforcing member is metal.

39. The vehicular weatherseal of claim 35, wherein the heat fusible powder coating includes one of a thermoplastic and thermoset material.

40. A vehicle weatherseal, comprising:
    (a) a three dimensional thermoplastic weatherseal body having a sealing portion and a trim portion, and
    (b) a colliquefiable powder coating directly adjacent at least an exterior portion of both the sealing portion and the trim portion, the colliquefiable powder coating selected to form a contiguous colliquefied layer on the portion of the sealing portion and the trim portion.

41. The vehicular weatherseal of claim 40, wherein one of the trim portion and the sealing portion has one of a foamed, cellular and sponge structure.

42. The vehicular weatherseal of claim 40, further comprising a reinforcing member in the thermoplastic weatherseal body.

43. The vehicular weatherseal of claim 42, wherein the reinforcing member is metal.

44. The vehicular weatherseal of claim 40, wherein the powder coating includes one of a thermoplastic and thermoset material.

45. A vehicular weatherseal, comprising:
    (a) a three dimensional thermoset weatherseal body including a sealing portion and carrier portion; and
    (b) a heat fusible thermosetting powder coating directly on an exterior of the sealing portion and directly on the exterior of the carrier portion the heat fusible thermosetting powder coating sufficient to form a contiguous fused layer on the sealing portion and the carrier portion.

46. The vehicular weatherseal of claim 45, further comprising a trim portion, wherein one of the trim portion and the sealing portion has one of a foamed, cellular and sponge structure.

47. The vehicular weatherseal of claim 45, further comprising a reinforcing member in the thermoset weatherseal body.

48. The vehicular weatherseal of claim 47, wherein the reinforcing member is metal.

49. A vehicular weatherseal, comprising:
   (a) a three dimensional thermoset weatherseal body having a sealing portion and a trim portion; and
   (b) a colliquefiable thermosetting powder coating directly on at least an exterior portion of the sealing portion and the trim portion, the colliquefiable thermosetting powder coating selected to form a continuous colliquefied surface layer on the portion of the sealing portion and the trim portion.

50. The vehicular weatherseal of claim 49, wherein one of the trim portion and the sealing portion has one of a foamed, cellular and sponge structure.

51. The vehicular weatherseal of claim 49, further comprising a reinforcing member in the thermoset weatherseal body.

52. The vehicular weatherseal of claim 51, wherein the reinforcing member is metal.

* * * * *

UNITED STATES PATENT AND TRADEMARK OFFICE
CERTIFICATE OF CORRECTION

PATENT NO. : 6,849,310 B2  Page 1 of 1
DATED : February 1, 2005
INVENTOR(S) : Kevin R. Willett It is certified that error appears in the above-identified patent and that said Letters Patent is hereby corrected as shown below:

Column 9,
Line 42, after "portion" insert -- and --.

Column 10,
Line 8, after "portion" insert -- and --.

Signed and Sealed this

Eleventh Day of April, 2006

JON W. DUDAS
*Director of the United States Patent and Trademark Office*